United States Patent [19]
Mounes-Toussi

[11] Patent Number: 6,098,152
[45] Date of Patent: Aug. 1, 2000

[54] METHOD AND APPARATUS FOR MISS SEQUENCE CACHE BLOCK REPLACEMENT UTILIZING A MOST RECENTLY USED STATE

[75] Inventor: Farnaz Mounes-Toussi, Minneapolis, Minn.

[73] Assignee: International Business Machines Corporation, Armonk, N.Y.

[21] Appl. No.: 08/953,396

[22] Filed: Oct. 17, 1997

[51] Int. Cl.$^7$ ..................................................... G06F 12/12
[52] U.S. Cl. ............................................................ 711/134
[58] Field of Search ................................... 711/133, 134, 711/136

[56] References Cited

U.S. PATENT DOCUMENTS

| | | | |
|---|---|---|---|
| 4,493,026 | 1/1985 | Olnowich | 711/128 |
| 4,885,680 | 12/1989 | Anthony et al. | 711/144 |
| 5,130,922 | 7/1992 | Liu | 711/144 |
| 5,261,066 | 11/1993 | Jouppi et al. | 711/122 |
| 5,317,716 | 5/1994 | Liu | 711/144 |
| 5,325,504 | 6/1994 | Tipley et al. | 711/128 |
| 5,367,653 | 11/1994 | Coyle et al. | 711/128 |
| 5,535,361 | 7/1996 | Hirata et al. | 711/145 |
| 5,588,131 | 12/1996 | Borrill | 711/146 |
| 5,706,463 | 1/1998 | Ebrahim et al. | 711/120 |
| 5,729,712 | 3/1998 | Whittaker | 711/122 |
| 5,793,941 | 8/1998 | Pencis et al. | 714/6 |

OTHER PUBLICATIONS

A Low–Cost Usage–Based Replacement Algorithm for Cache Memories, Yannick DeVille, pp. 53–58, ACM, 1990.
Data Cache Management Using Frequency–Based Replacement, Murthy V. Devarakonda and John T. Robinson, pp. 134–142, ACM, 1990.
Cache Operations by MRU Change, IEEE Transactions on Computers, vol. 37, No. 6, Rudolph N. Rechtschaffen and Kimming So, pp. 700–708.
Instruction Cache Replacement Policies and Organizations, IEEE Transactions on Computers, vol. C–34, No. 3, Mar. 1985, James R. Goodman and James E. Smith, pp. 234–241.
Cache Replacement with Dynamic Exclusion, Scott McFarling, pp. 191–200, ACM, 1992.
Pendse et al, "A Fuzzy Block Replacement Algorithm for Disk Caches", 1997, pp. 995–998, IEEE.
Mounes–Toussi, "The Effect of Using State–Based Priority Information in a Shared–Memory Multiprocessor Cache Replacement Policy," IEEE, 1998, pp. 217–224.

*Primary Examiner*—Eddie P. Chan
*Assistant Examiner*—Kevin L. Ellis
*Attorney, Agent, or Firm*—Joan Pennington

[57] ABSTRACT

A method and apparatus are provided for miss sequence cache block replacement in a cache including a plurality of cache blocks in a computer system. First checking for an invalid block is performed. Responsive to identifying an invalid cache block, the identified invalid block is selected for replacement. If an invalid cache block is not found, then checking for a first priority cache block and not equal to most recently used (MRU) state is performed. Responsive to identifying a first priority cache block and not equal to most recently used (MRU) state, the identified first priority cache block is selected for replacement. If a first priority cache block and not equal to most recently used (MRU) state is not found, then checking for a next priority cache block and not equal to most recently used (MRU) state is performed. Responsive to identifying a next priority cache block and not equal to most recently used (MRU) state, the identified next priority cache block is selected for replacement. In the absence of identifying an invalid cache block, a first priority cache block and not equal to most recently used (MRU) state, or a next priority cache block and not equal to most recently used (MRU) state, one of the plurality of cache blocks is randomly selected for replacement. A tag field stores the most recently used (MRU) state information which is used to determine where not to replace a cache block in the cache.

20 Claims, 16 Drawing Sheets

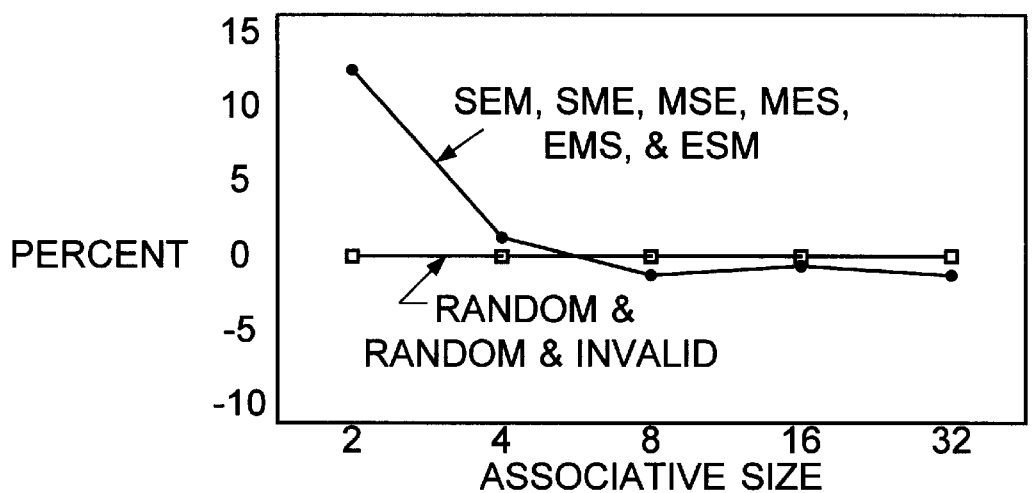
FIGURE 4A  FFT 16K CACHE
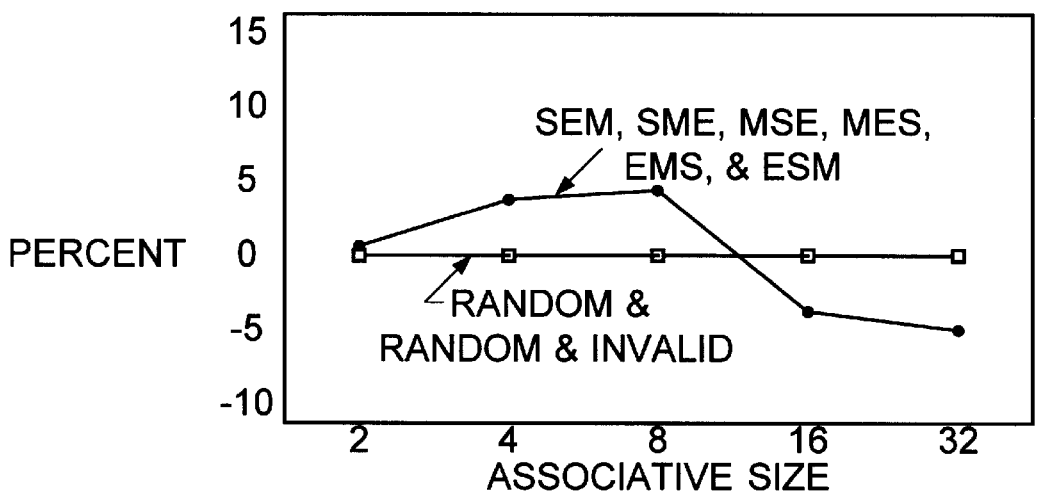
FIGURE 4B  FFT 64K CACHE

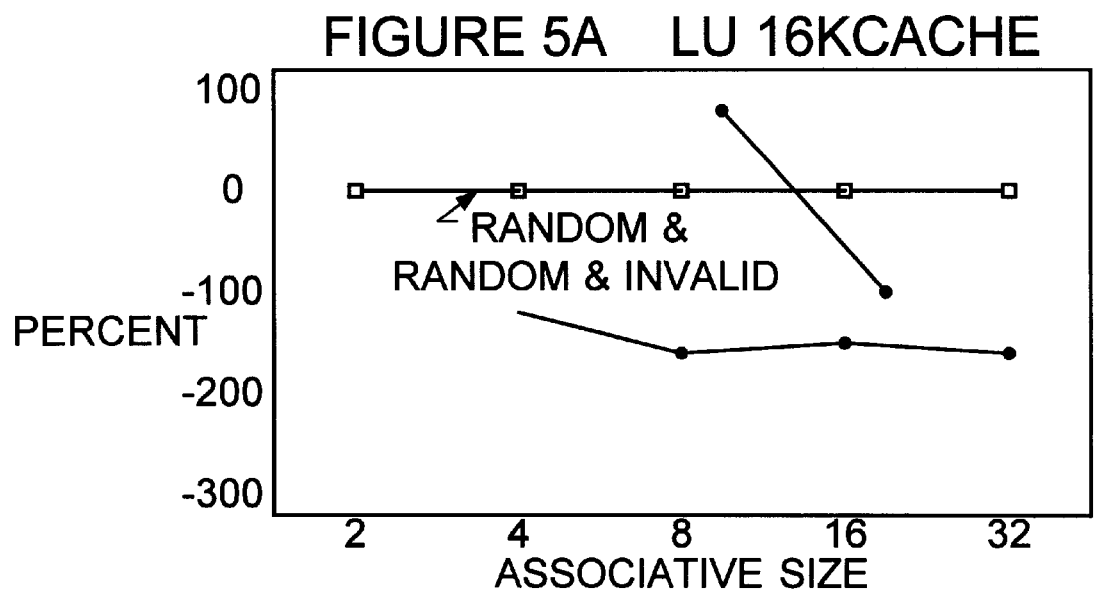
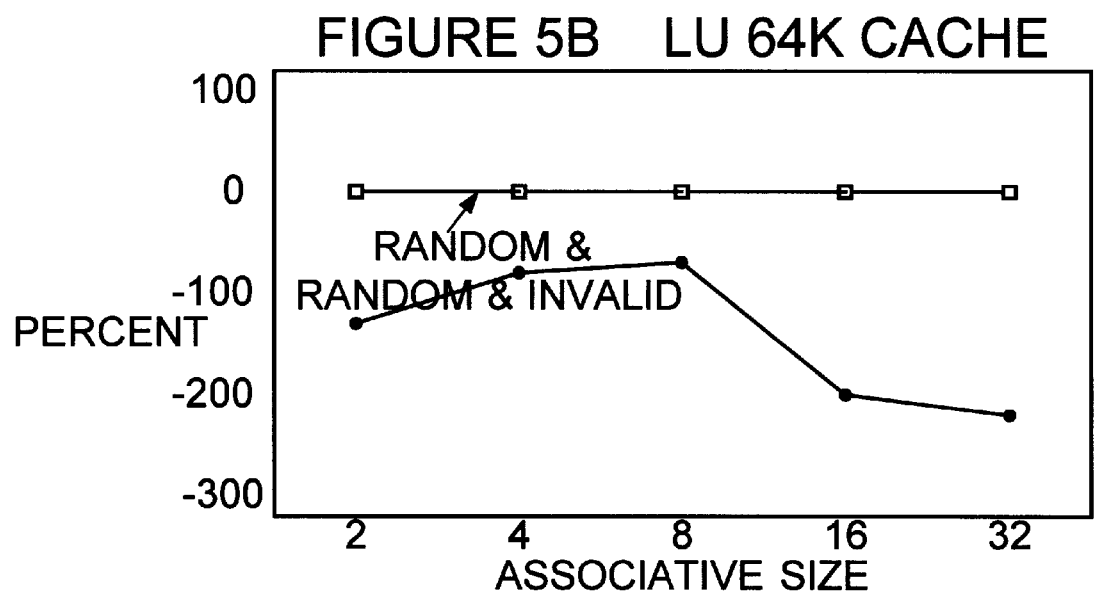

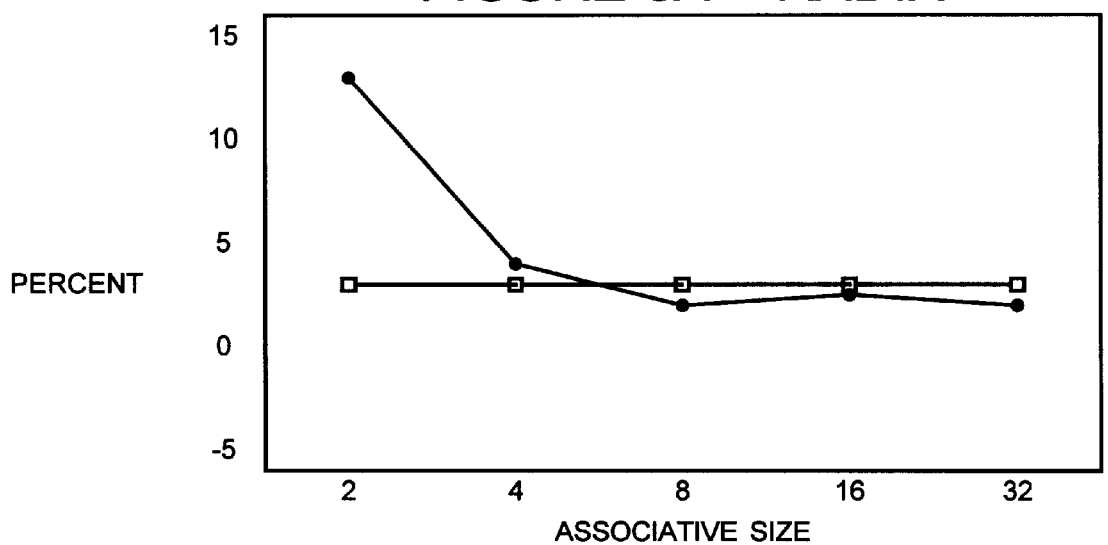
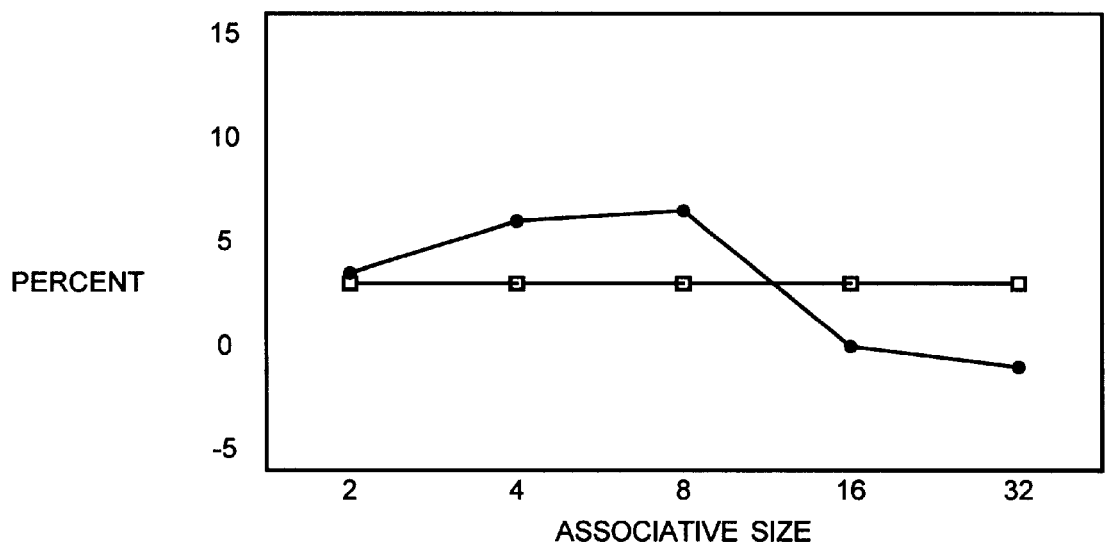

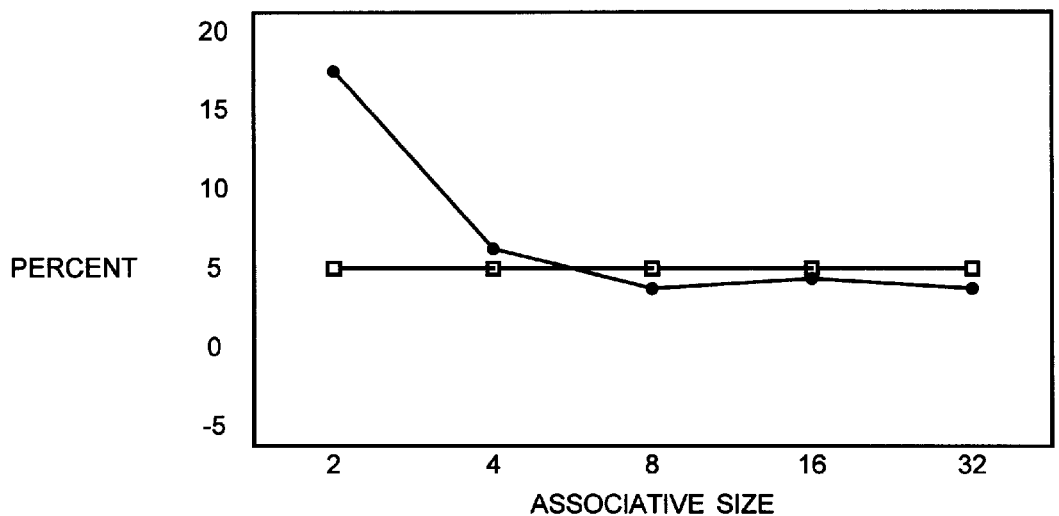
FIGURE 7A BUK
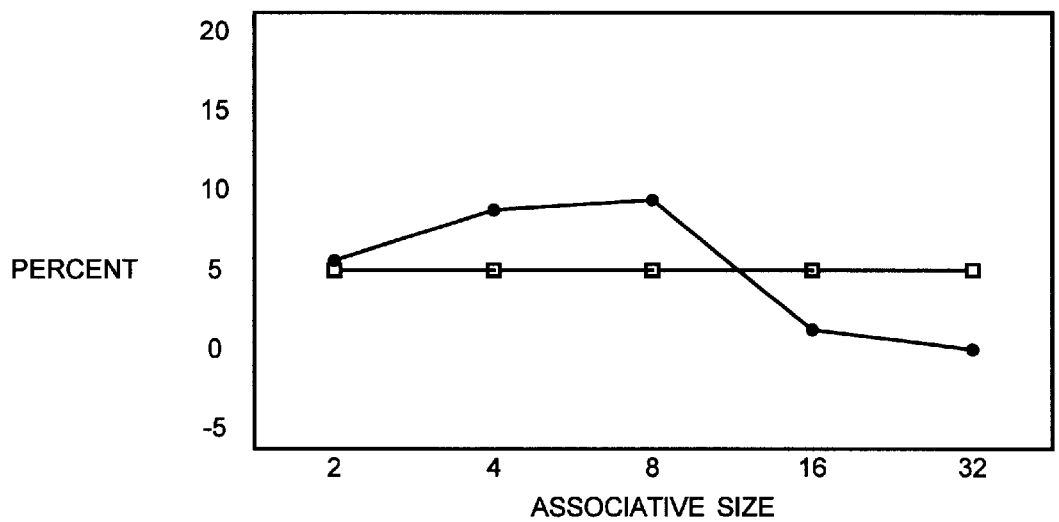
FIGURE 7B BUK

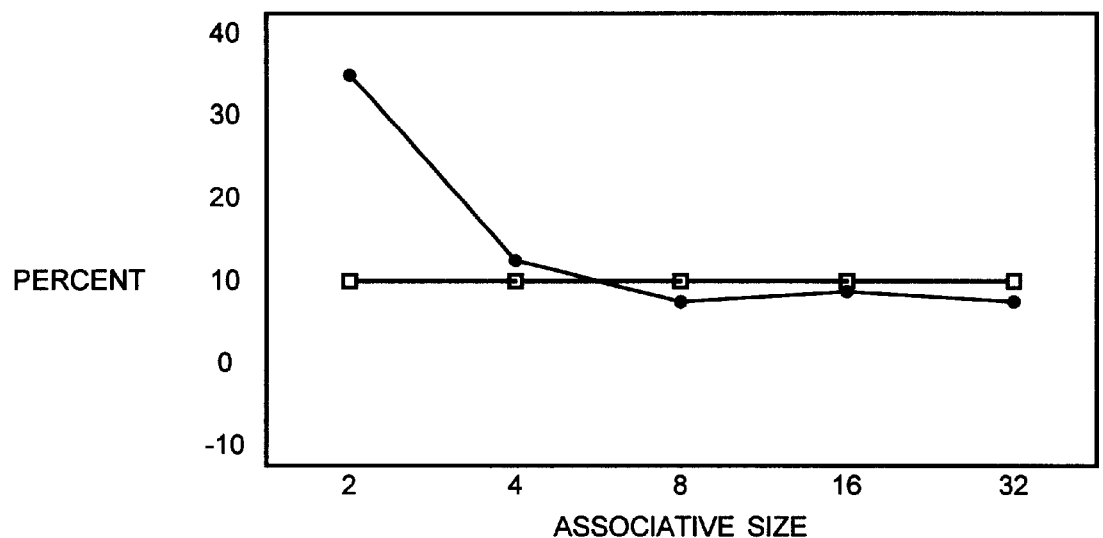
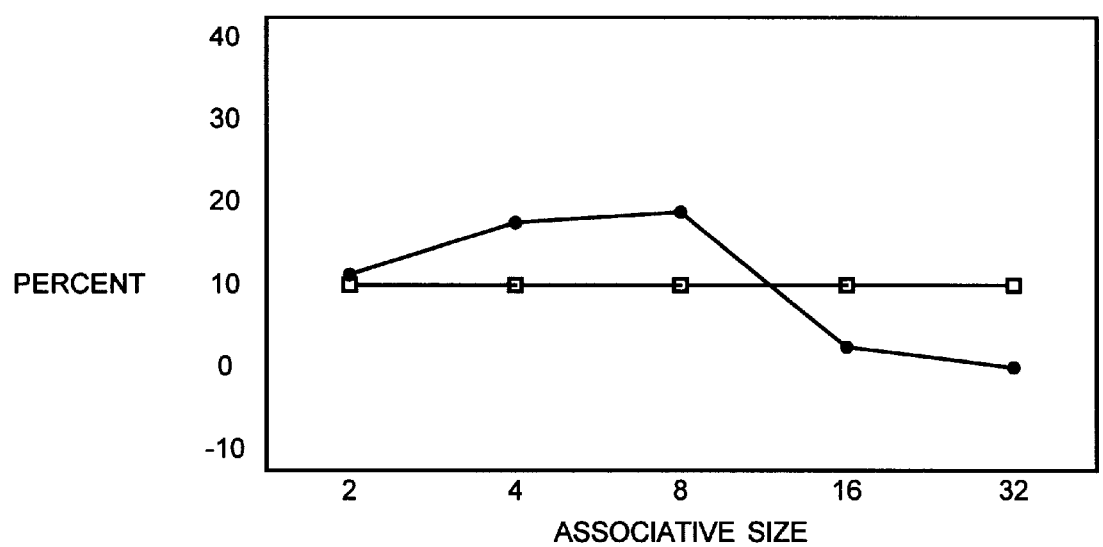

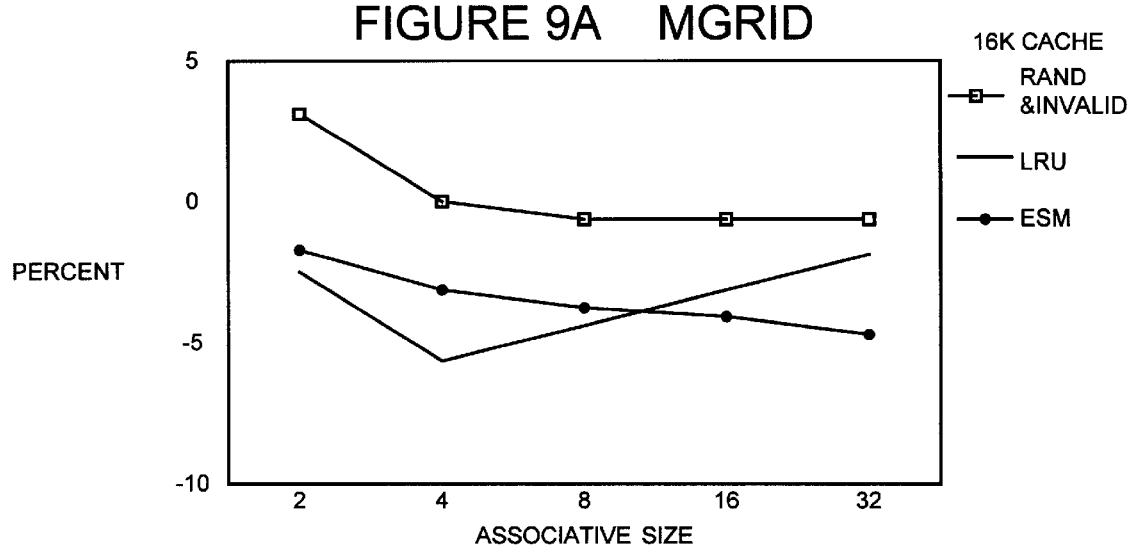
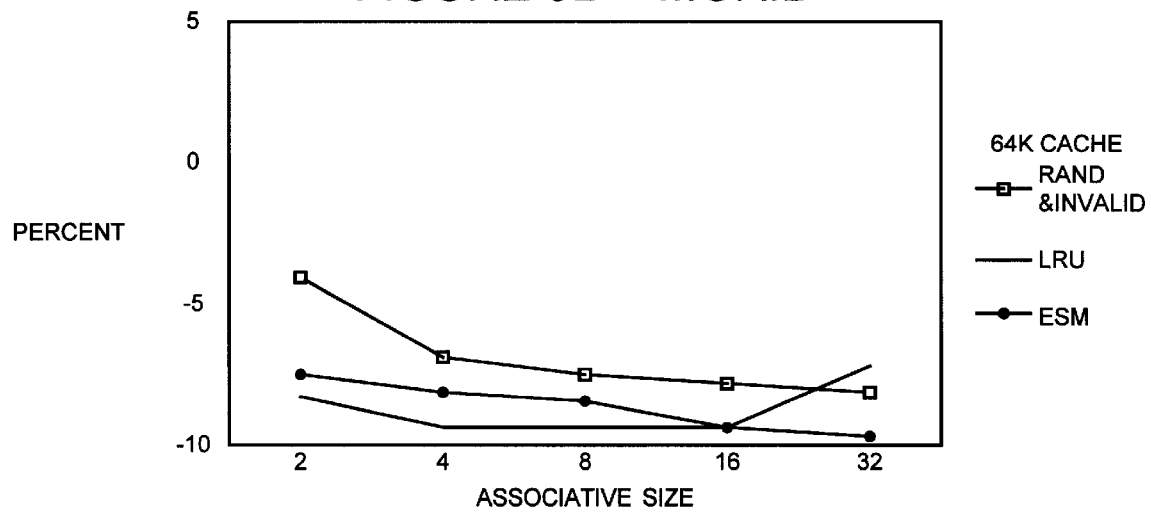

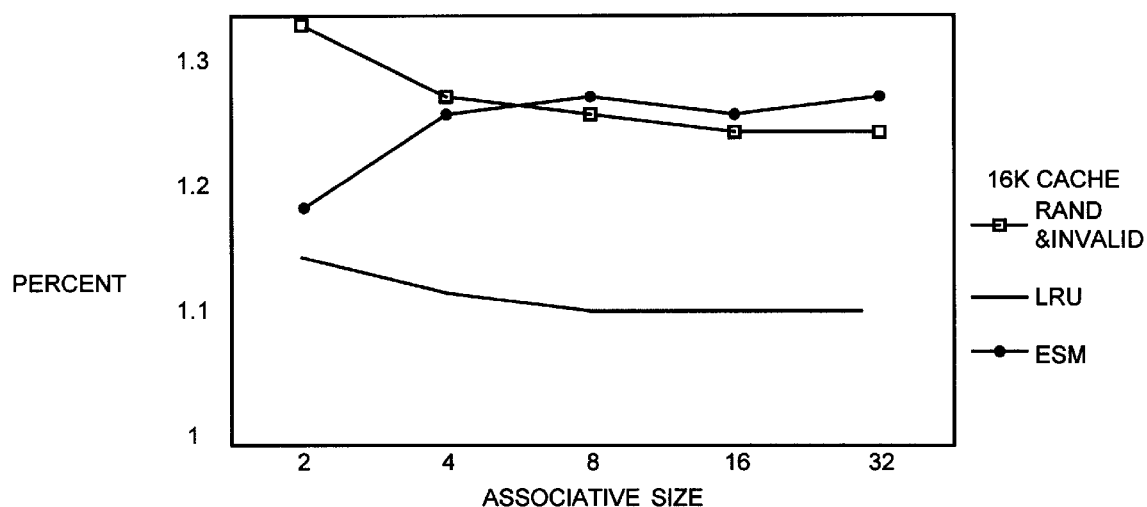
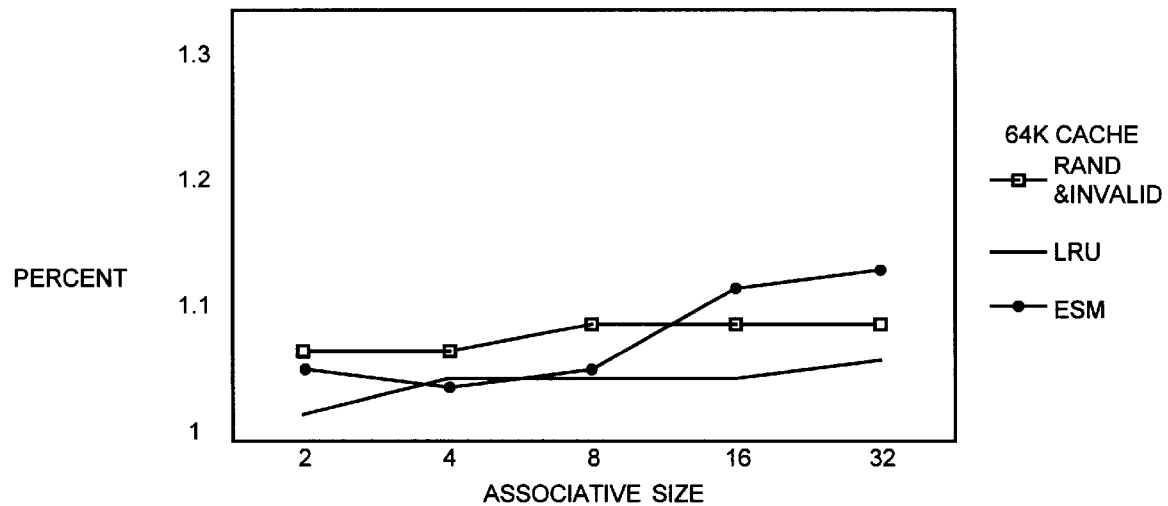

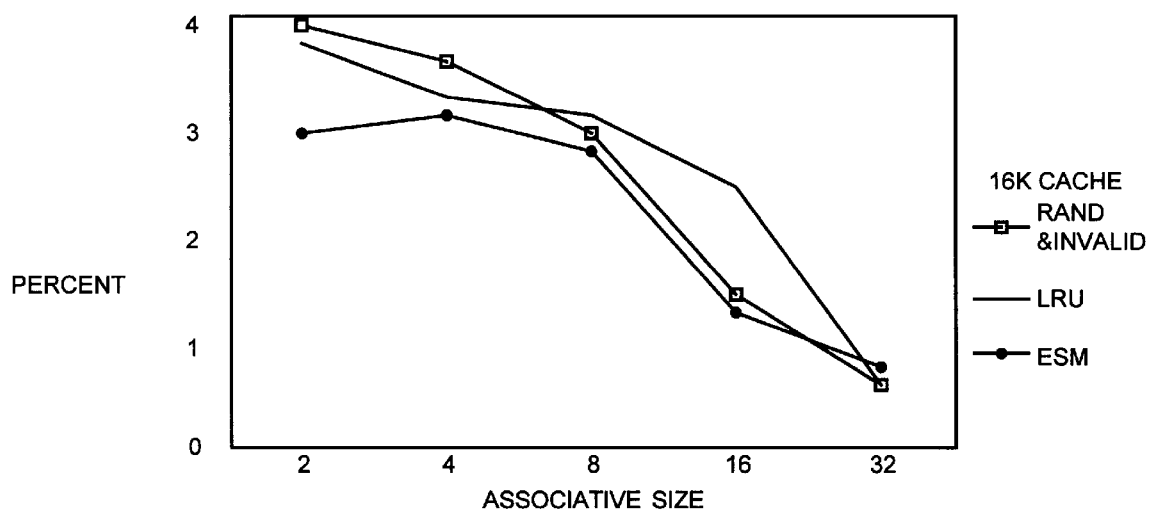
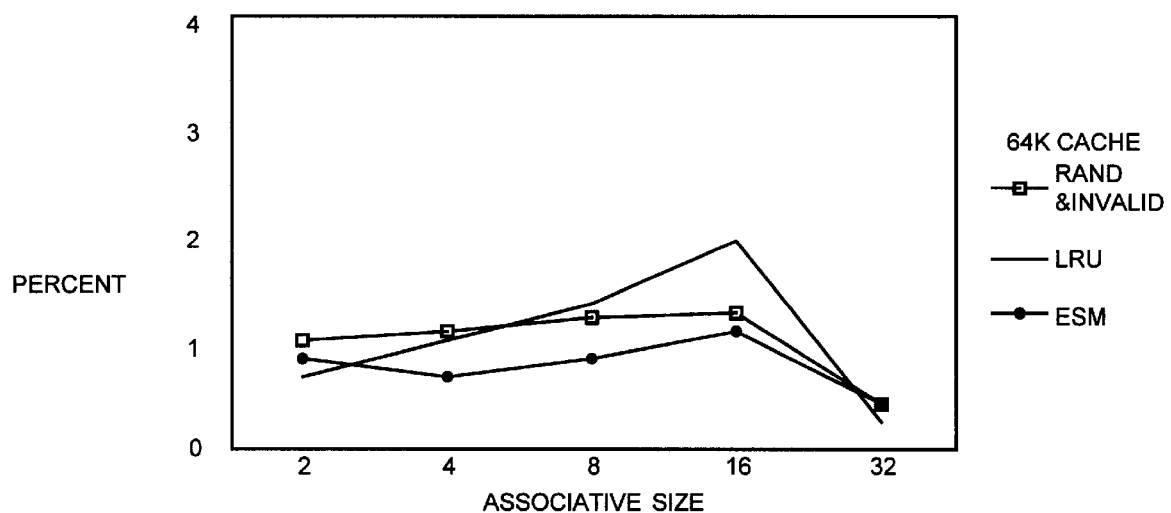

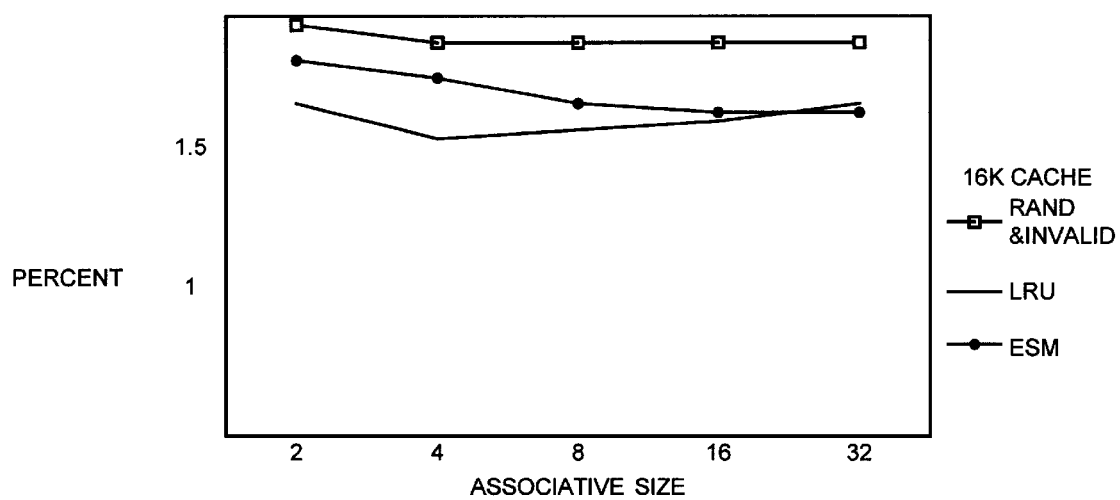
FIGURE 12A BUK
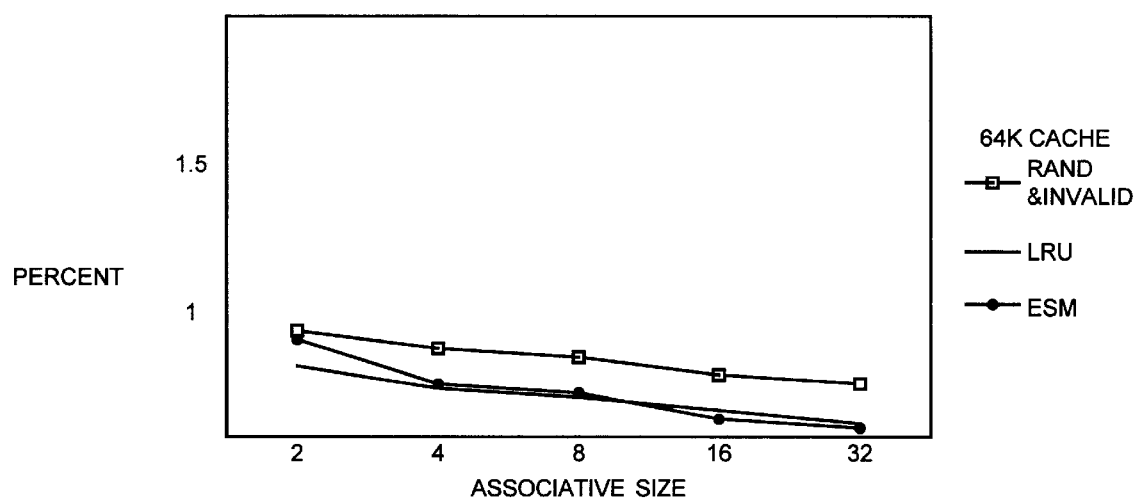
FIGURE 12B BUK

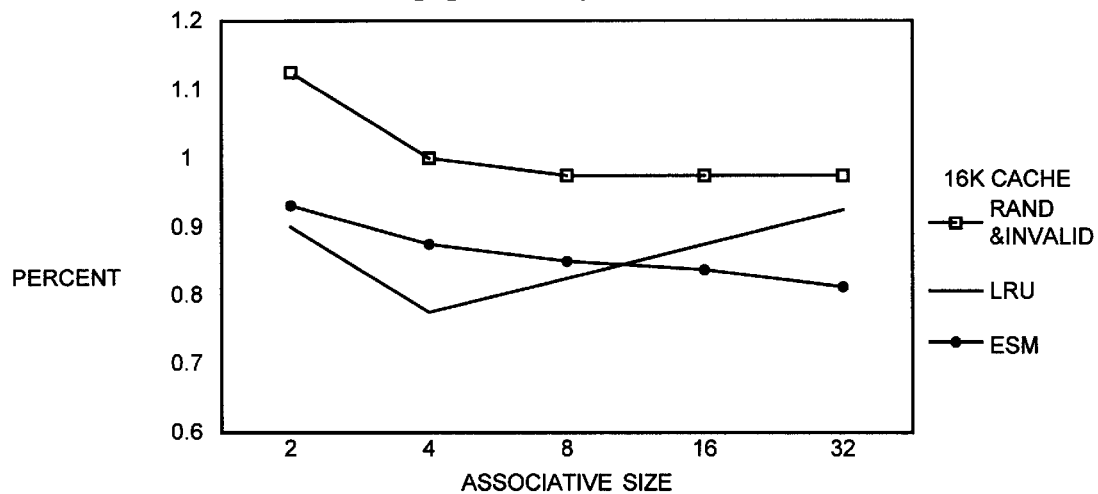
FIGURE 13A BUK
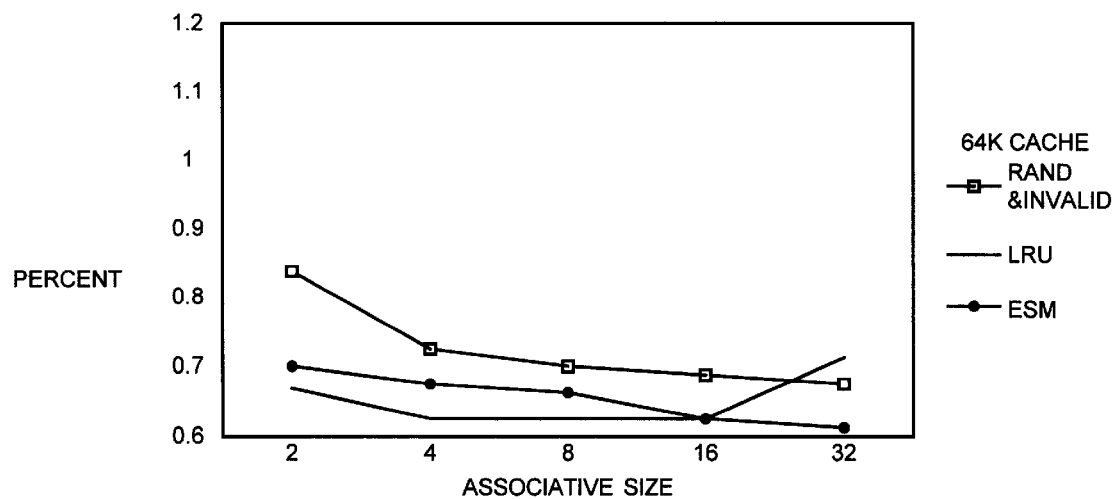
FIGURE 13B BUK

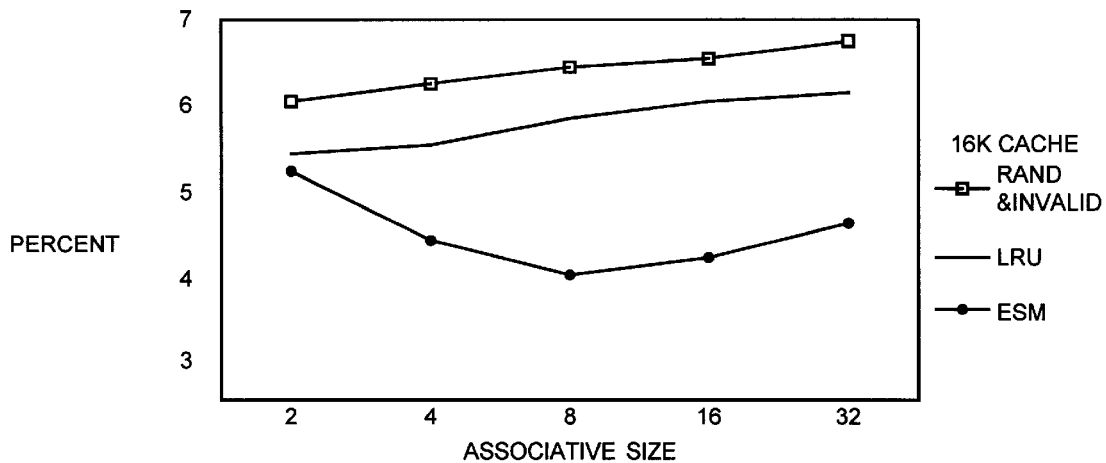
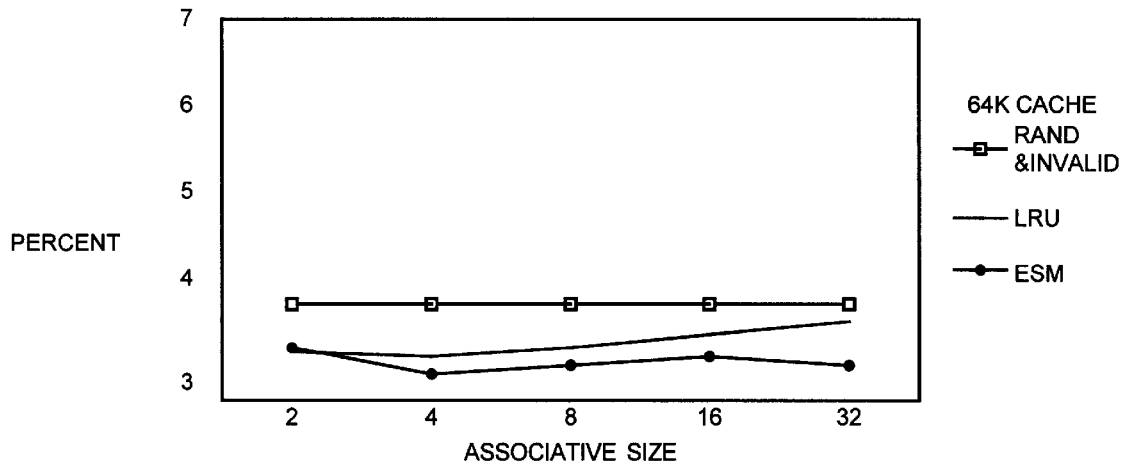

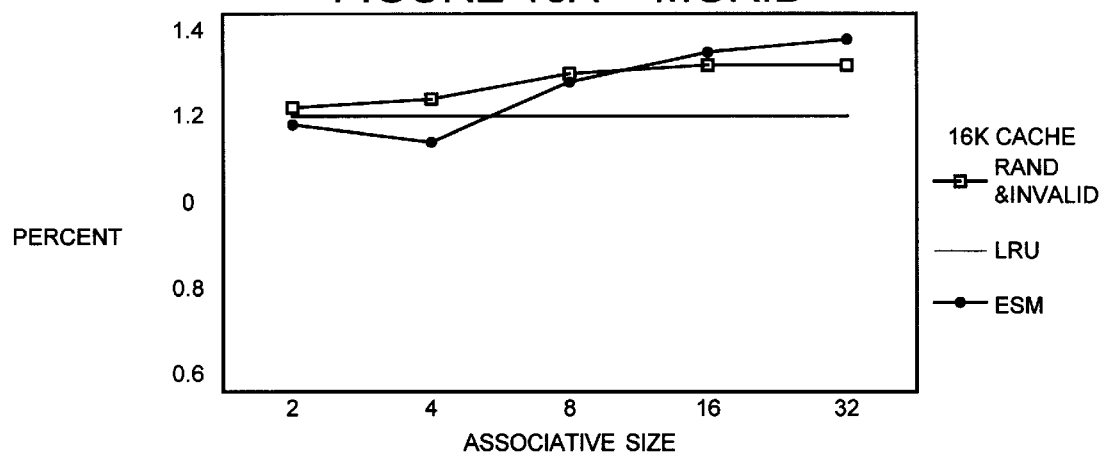
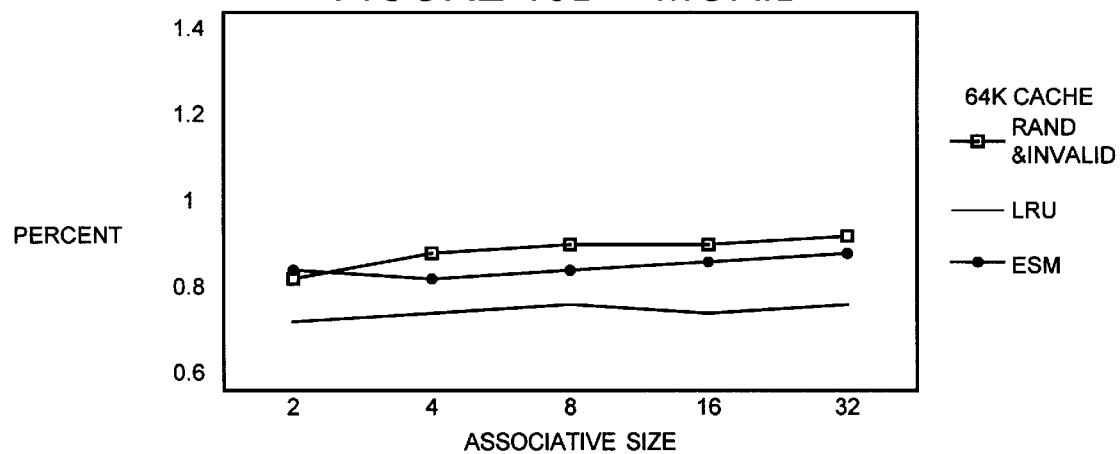

METHOD AND APPARATUS FOR MISS SEQUENCE CACHE BLOCK REPLACEMENT UTILIZING A MOST RECENTLY USED STATE

FIELD OF THE INVENTION

The present invention generally relates to a computer architecture, cache memory systems and the data processing field, and more particularly, relates to, methods and apparatus for determination of which entries in a cache are to be replaced with cache miss sequences.

DESCRIPTION OF THE RELATED ART

Computer have become increasingly faster and one of the ways in which to increase the speed of computers is to increase the clock speed of the processors. Computer system performance is limited by processor stalls when the processor must wait for data from memory to continue processing. In order to reduce data access time, special purpose high-speed memory spaces of static random access memory (RAM) called a cache are used to temporarily store data which are currently in use. For example, the cached data can include a copy of instructions and/or data obtained from main storage for quick access by a processor. A processor cache typically is positioned near or integral with the processor. Data stored in the cache advantageously may be accessed by the processor in only one processor cycle retrieving the data necessary to continue processing; rather than having to stall and wait for the retrieval of data from a secondary memory, such as a higher level cache memory or main memory.

Another cache example is the buffer memory included an input/output (I/O) bridge chip. An I/O bridge chip provides the connection between two different data buses in a computer system. Also an I/O bridge chip can be part of an input/output processor (IOP). An I/O bridge chip typically contains a cache, some registers, and the components necessary to connect two different buses together. Data flows to and from devices connected to one of the buses, through the bridge chip and its cache and to and from another bus, which might be connected to a different device or host computer. An example of such a configuration is a host computer with a host bus connected to a bridge chip, which is further connected to another bus that attaches multiple I/O processors.

When the processor requests a data item or word from memory, the cache is accessed when the processor processes a memory access instruction. If the desired word, for example, data or program instruction, resides in the cache, this is called a cache hit and the desired word is read from the cache. If the desired data or program instruction is not found in the cache, this is a called cache miss. With a cache miss, secondary memory is accessed to read that word, and a block of words containing that word is transferred from the main memory to the cache and the processor. A cache miss causes the processor to wait or creates a stall, degrading system performance.

Various techniques are known for mapping blocks of main memory into the cache. Known methods of mapping main memory and cache addressing include a direct mapping cache configuration, a set-associative cache configuration, and a fully associative cache configuration. The physical locations that make up the cache are called cache blocks or lines. Each cache block has a tag or a set of address tags associated with it.

In a direct-mapped cache, any program block can be placed in only one location in the cache or in only one cache block. The direct-mapped cache is a one-way set associative cache; each cache entry holds one block and forms a set with one element. In the direct-mapped cache, a program block can only be placed in one cache block so there is only one possible replacement policy.

In a set-associative cache, cache blocks are divided into sets and a program block may be placed within any of the cache blocks in one set. A fully associative cache with M entries is an M-way set associative cache; it has one set with M blocks and an entry can reside in any block within that set. The memory address is divided into tag, set number and block offset fields. The block offset field indicates the address of the desired data within the block; the set number or index field identifies the set of cache blocks that may contain a program block; and the tag field is compared with the tags of all the cache blocks in the set to determine if there is a cache hit.

With a cache miss, a transferred word replaces a block in the set associative cache according to a replacement policy. One measure of cache performance is a miss ratio defined as the total number of cache misses relative to the total number of read and write references. Various replacement policies or algorithms have been implemented in set-associative caches to determine which cache block is to be used to fill data when a cache miss occurs. Least recently used (LRU) and random are the two primary algorithms for replacement of blocks.

In set associative caches using the LRU algorithm, the data which is replaced is that data which is least recently used. A counter is assigned per block per set and then given an average over a period of time, the LRU block is written to memory and replaced with fresher, incoming data. The problem is that LRU is costly in terms of hardware complexity so that the LRU scheme is used for two-way or four-way associative caches. To improve performance, other algorithms which have been designed to estimate the LRU blocks.

In the random replacement scheme, there is no need for bit vectors in counters which have to updated each time data in the block is used, as required for LRU schemes. In any cache the blocks in a cache have three states: invalid, exclusive, and modified. If there is more than one processor, the blocks in the cache can have a fourth shared state.

The random algorithm is simpler than the LRU algorithm, but it does not take advantage of the programs referencing patterns. That is, the random algorithm selects cache blocks regardless of the locality of references. The LRU algorithm, on the other hand, takes advantage of locality of references by keeping track of accesses to each block within a set and by replacing the block not used for the longest time. As a result, the LRU algorithm outperforms the random algorithm, but at the expense of additional hardware. While the hardware cost of the random algorithm is independent of the number of blocks within a set, the overhead of the LRU algorithm increases as the number of blocks increases within a set.

A need exists for an improved cache block replacement algorithm to provide improved cache performance. It is desirable to provide such improved cache block replacement algorithm that is simple to implement and that takes advantage of state information.

SUMMARY OF THE INVENTION

A principal object of the present invention is to provide an improved cache block replacement method and apparatus in a set-associative cache. Other objects are to provide such method and apparatus that leave most recently used (MRU) data in the cache; to provide such method and apparatus without increasing the complexity of the hardware or the software as the number of the blocks in a set increase; to provide such method and apparatus substantially without negative effects, and that overcome many of the disadvantages of prior art arrangements.

In brief, a method and apparatus are provided for miss sequence cache block replacement in a cache including a plurality of cache blocks in a computer system. First checking for an invalid block is performed. Responsive to identifying an invalid cache block, the identified invalid block is selected for replacement. If an invalid cache block is not found, then checking for a first priority cache block and not equal to most recently used (MRU) state is performed. Responsive to identifying a first priority cache block and not equal to most recently used (MRU) state, the identified first priority cache block is selected for replacement. If first priority cache block and not equal to most recently used (MRU) state is not found, then checking for a next priority cache block and not equal to most recently used (MRU) state is performed. Responsive to identifying a next priority cache block and not equal to most recently used (MRU) state, the identified next priority cache block is selected for replacement. In the absence of identifying an invalid cache block, a first priority cache block and not equal to most recently used (MRU) state, or a next priority cache block and not equal to most recently used (MRU) state, one of the plurality of cache blocks is randomly selected for replacement.

In accordance with features of the invention, a tag field stores the most recently used (MRU) state information which is used to determine where not to replace a cache block in the cache.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4A, 4B, 5A, 5B, 6A, 6B, 7A, 7B, 8A, 8B, 9A, 9B are charts illustrating simulated performance effects of the cache block replacement method of the preferred embodiment relative to conventional random and random and invalid cache block replacement methods with 16K and a 64K set-associative write-back caches with percent values shown relative to the vertical axis and associativity sizes shown relative to the horizontal axis; and FIGS. 10A, 10B, 11A, 11B, 12A, 12B, 13A, 13B, 14A, 14B, 15A, 15B are charts illustrating simulated performance effects of the cache block replacement method of the preferred embodiment together with conventional random and invalid and least recently used (LRU) cache block replacement methods with 16K and a 64K set-associative writeback caches with miss ratio values shown relative to the vertical axis and associativity sizes shown relative to the horizontal axis.

DETAILED DESCRIPTION OF THE PREFERRED EMBODIMENT

Figure 1A:
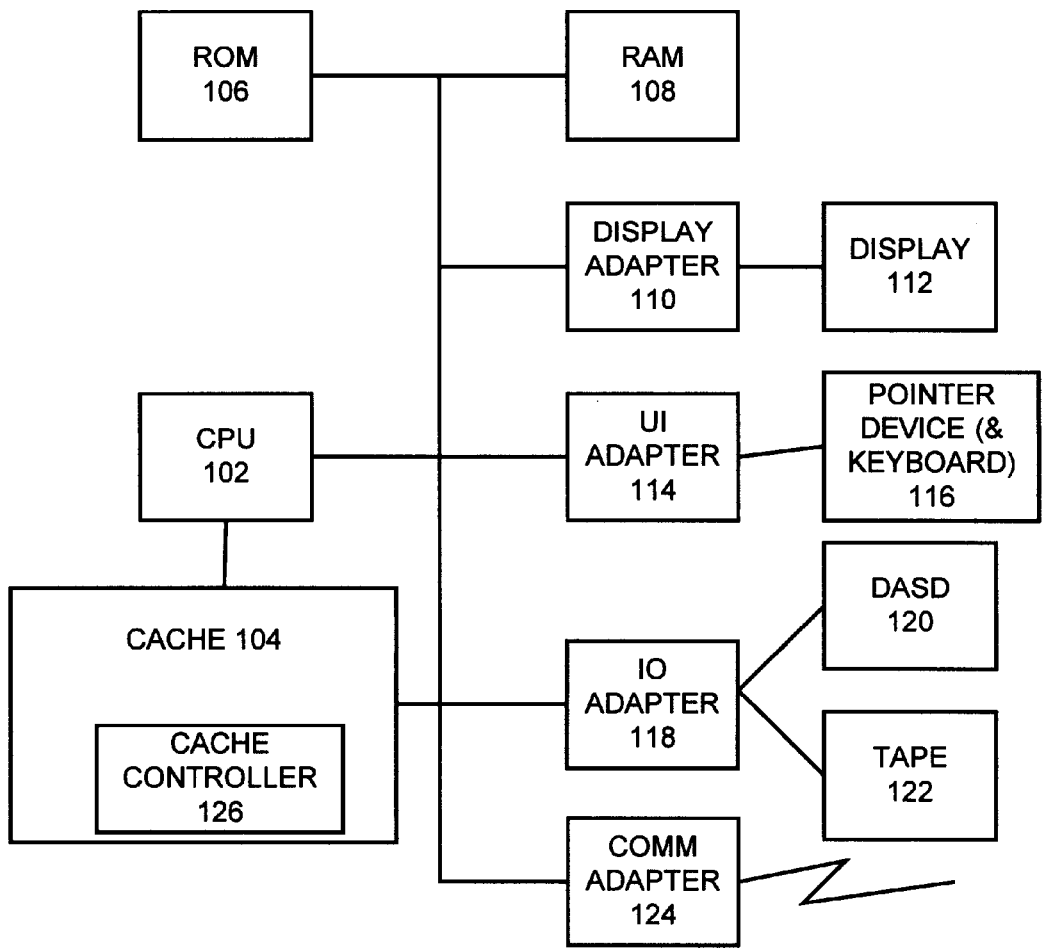
FIG. 1A is a block diagram representation illustrating a first computer system for implementing a cache block replacement method and apparatus for cache block replacement in accordance with the preferred embodiment.

Having reference now to the drawings, in FIG. 1A, there is shown a first computer or data processing system generally designated by the reference character 100 for implementing a cache block replacement method and apparatus in accordance with the preferred embodiment. As shown in FIG. 1A, computer system 100 includes a central processor unit (CPU) 102, a static random access memory or cache 104, a read only memory 106, a secondary random access memory 108, a display adapter 110 coupled to a display 112. CPU 102 is connected to a user interface (UI) adapter 114 connected to a pointer device and keyboard 116. CPU 102 is connected to an input/output (IO) adapter 118 connected to a direct access storage device (DASD) 120 and a tape unit 122. CPU 102 is connected to a communications adapter 124 providing a communications function. Computer system 100 includes a cache controller 126 arranged together with cache 104 for implementing the cache block replacement method and apparatus in accordance with the preferred embodiment.

Figure 1B:
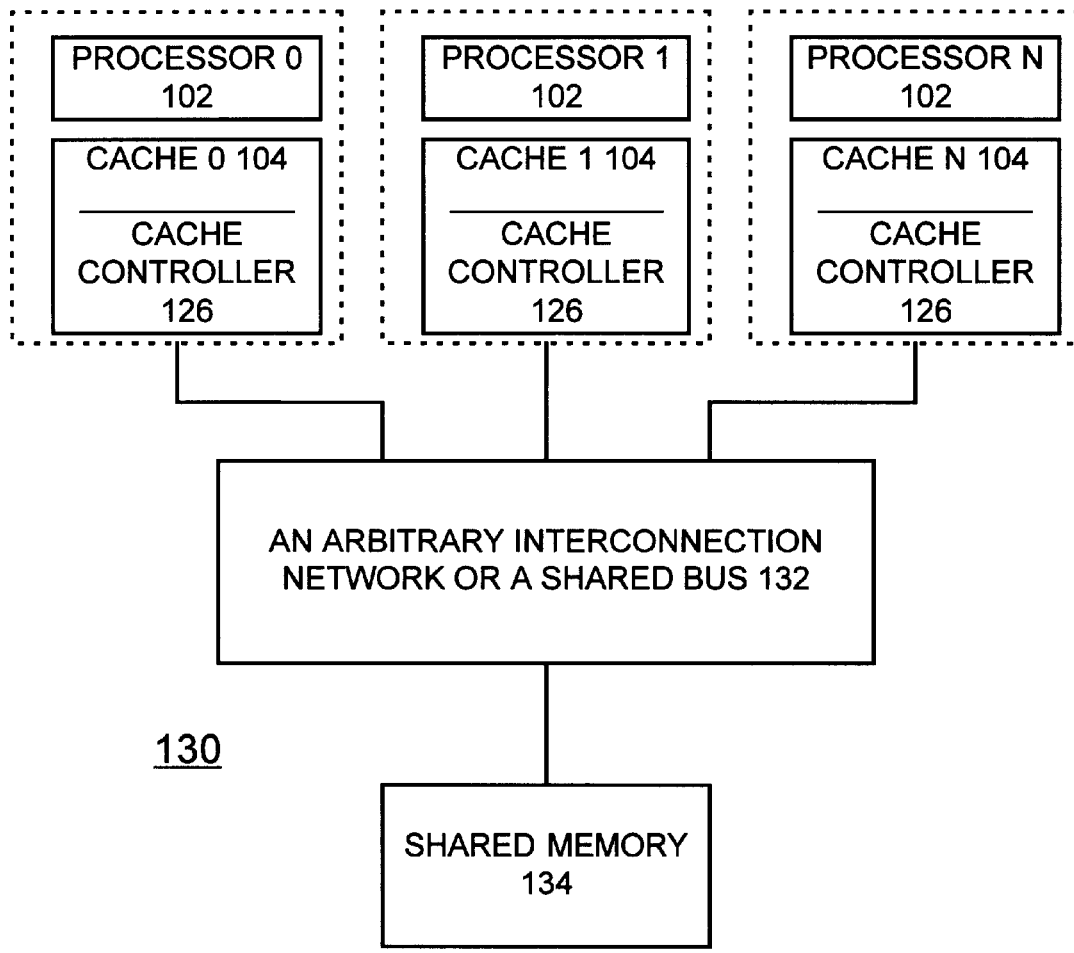
FIG. 1B is block diagram representation illustrating a second multiprocessor computer system for implementing a cache block replacement method and apparatus for cache block replacement in accordance with the preferred embodiment.

In FIG. 1B, there is shown a second shared-memory multiprocessor system generally designated by 130 for implementing a cache block replacement method and apparatus in accordance with the preferred embodiment. As shown in FIG. 1B, system 130 includes a plurality of processors 102. Each processor 102 is associated with a cache 104. As in the single processor computer system 100 of FIG. 1A, cache controller 126 is arranged together with cache 104 for implementing the cache miss sequence cache block replacement method and apparatus in accordance with the preferred embodiment. An arbitrary interconnection network or a shared bus 132 couples the multiple processors 102 to a shared memory 134.

In FIGS. 1A and 1B, computer systems 100 and 130 are illustrated in simplified and diagrammatic form sufficient for an understanding of the present invention. The utility of the present invention is not restricted to the details of a particular arrangement of cache 104 and cache controller 126. In accordance with the preferred embodiment, cache 104 is a set-associative cache arranged as a store-in or write-back cache. However, it should be understood that the present invention can be used with a fully associative cache, arranged as a store-in or write-back cache or a store-through cache.

Figure 2A:
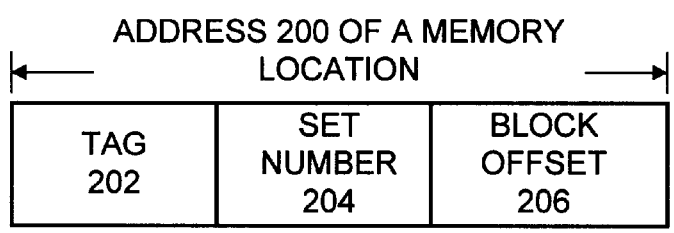
FIG. 2A is a block diagram representation illustrating an address of each cache memory location or cache block in the computer systems of FIGS. 1A and 1B in accordance with the preferred embodiment.

FIG. 2A illustrates an address 200 of a cache memory location divided into three fields including a tag 202, a set number 204, and a block offset 206. The block offset 206 is used to access one or more bytes within a block. The tag field 202 identifies a unique cache block. The tag field 202 is compared with the tags of all the cache blocks in the set to determine if there is a cache hit. The set number field 204 identifies the set of cache blocks that may contain a program block. The block offset field 206 indicates the address of the desired data within the block.

Figure 2B:
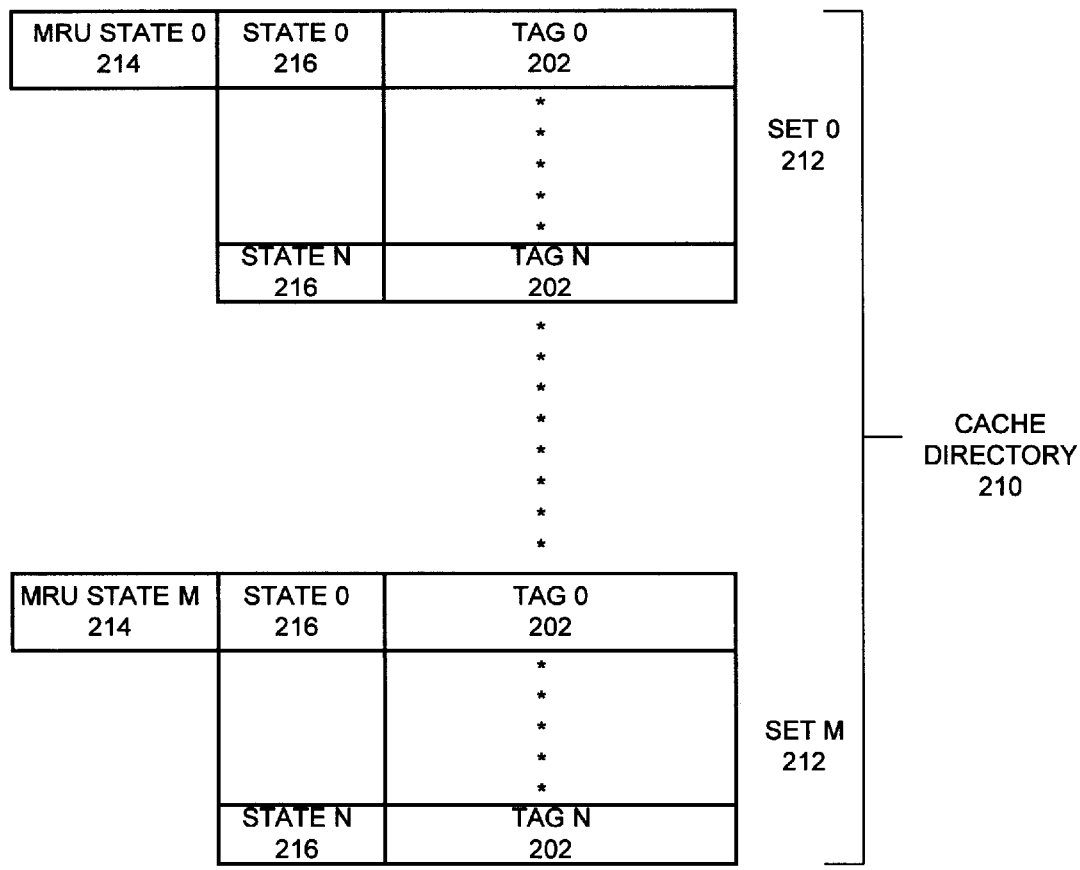
FIG. 2B illustrating a cache directory in the computer systems of FIGS. 1A and 1B including apparatus for cache block replacement in accordance with the preferred embodiment.

FIG. 2B illustrates a cache directory 210 used in the computer systems 100 and 130 of FIGS. 1A and 1B including cache miss sequence apparatus for cache block replacement in accordance with the preferred embodiment. FIG. 2B shows the cache directory 210 of a set-associative cache 104. The cache directory 210 includes a plurality of sets 212 (0–M). Each set 212 consists of a plurality of tags 202 (0–N). A most recently used (MRU) state field 214 defines the state of the cache block most recently received or used. In accordance with features of the invention, the MRU state 214 is used to ensure that a recently received block is not selected for replacement on a cache miss sequence. Each tag 202 identifies a unique cache block and includes a respective state field 216 for the identified cache block. The state field 216 is a function of the cache coherence protocol and the number of transient states, if any. For instance, with a coherence protocol for cache 104 similar to the modified, shared, exclusive, invalid (MESI) coherence protocol, the state field can be in any of the following five states: exclusive, shared, modified, invalid, or shared-modified.

Each cache block can be in an invalid state or not present in cache 104. Each cache block can be in a shared-modified state where the processor 102 has the only valid copy of the block and the memory copy is stale. The processor had a shared copy of a cache block before making the transition to the shared modified state. The shared state indicates that multiple copies of the block exists and the memory copy is up-to-date. The exclusive state indicates that only one copy of the block exists and the memory copy is up-to-date. The modified state indicates that the associated processor 102 has the only valid copy of the cache block and the memory copy is stale.

In brief, the cache block replacement method of the invention provides an improvement over the random strategy which is capable of taking into account locality of references, while keeping the hardware cost independent of the number of blocks within a set. In particular, the state information 216 associated with each cache block is used in conjunction with random strategy. On a cache miss, a cache block is selected for replacement base on a plurality of predefined priorities from high to low, for example, of invalid, shared-modified, shared, exclusive and modified. If two or more blocks within a set 212 have equal priority, one of the blocks is selected randomly. It should be noted that blocks in the shared-modified state tend to have low locality, and thus, a replaced shared-modified block is less likely to be referenced again in the near future. Additionally, a shared block or an exclusive block is selected over a modified block to reduce the probability of increasing processor-memory traffic due to block replacements. Finally, a shared block is chosen over an exclusive block since a shared block can potentially exhibit lower locality than an exclusive block.

Figure 3:
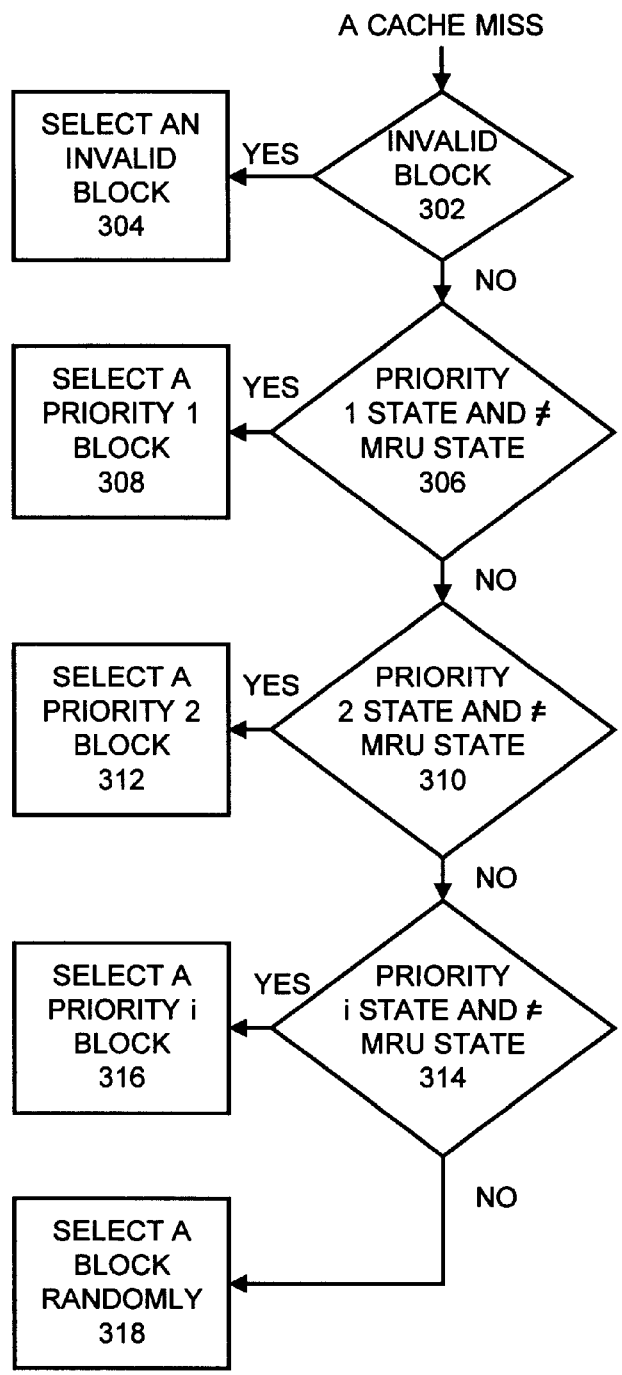
FIG. 3 is a flow chart illustrating the cache miss sequence cache block replacement method and apparatus in accordance with the preferred embodiment.

FIG. 3 is a flow chart illustrating the cache miss sequence cache block replacement method and apparatus in accordance with the preferred embodiment. Responsive to a cache miss, first checking for an invalid cache block is performed as indicated at a decision block 302. If there is a cache block in the invalid state, then a block in the invalid state is selected as indicated at a block 304. Otherwise, checking for a cache block in the priority 1 state such that the state is not equal to the MRU state is performed as indicated at a decision block 306. If there is a block in the priority 1 state such that the state is not equal to the MRU state, then a block in the priority 1 state is selected for replacement as indicated at a block 308. Otherwise, checking for a cache block in the priority 2 state such that the state is not equal to the MRU state is performed as indicated at a decision block 310. If there is a block in the priority 2 state such that the state is not equal to the MRU state then a block in the priority 2 state is selected as indicated at a block 312. Otherwise, checking for a cache block in the priority i state such that the state is not equal to the MRU state is performed as indicated at a decision block 314. If there is a block in the priority i state such that the state is not equal to the MRU state, then a block in the priority i state is selected as indicated at a block 316. In the absence of identifying an invalid cache block at block 302, a first priority cache block and not equal to most recently used (MRU) state at block 306, or a next priority cache and not equal to most recently used (MRU) state at blocks 310 and 314, one of the plurality of cache blocks is randomly selected for replacement as indicated at a block 318. Alternatively, another replacement strategy could be used, such as the LRU policy for selecting a cache block for replacement at block 318.

It should be understood that the block replacement method of the invention is not limited to assigning a priority to each state. A combination of states can be used as well for any priority state. For instance, the exclusive and shared states can define a first priority 1 state.

Referring now to FIGS. 4–15, simulated performance effects of the cache block replacement method of the preferred embodiment relative to conventional cache block replacement methods are shown. In FIGS. 4–15, performance effects with a 16K cache are shown in an upper chart at the top of the page. The performance effects with a 64K cache are shown in a second lower chart in FIGS. 4–15. FIGS. 4–9 illustrate performance percent values of the cache block replacement method of the preferred embodiment relative to conventional random and random and invalid cache block replacement methods. In FIGS. 4–9, performance percent values are shown relative to the vertical axis and multiple associativity sizes (varied from 2 to 4 to 8 to 16 to 32) are shown relative to the horizontal axis. set-associative write-back data cache 104. In FIGS. 4–9, six variations of the cache miss sequence cache block replacement method or pseudo random replacement policy of the invention are shown. The six illustrated pseudo random replacement policies include SEM, SME, MSE, MES, EMS, and ESM.

The SEM pseudo random replacement policy of the invention selects a block for replacement based on the following priorities: 1) Invalid, 2) Shared-Modified, 3) Shared, 4) Exclusive, 5) Modified.

The SME pseudo random replacement policy of the invention selects a block for replacement based on the following priorities: 1) Invalid, 2) Shared-Modified, 3) Shared, 4) Modified, 5) Exclusive.

The MSE pseudo random replacement policy of the invention selects a block for replacement based on the following priorities: 1) Invalid, 2) Shared-Modified, 3) Modified, 4) Shared, 5) Exclusive.

The MES pseudo random replacement policy of the invention selects a block for replacement based on the following priorities: 1) Invalid, 2)Shared-Modified, 3) Modified, 4) Exclusive, 5) Shared.

The EMS pseudo random replacement policy of the invention selects a block for replacement based on the following priorities: 1) Invalid, 2) Shared-Modified, 3) Exclusive, 4) Modified, 5) Shared.

The ESM pseudo random replacement policy of the invention selects a block for replacement based on the following priorities: 1) Invalid, 2) Shared-Modified, 3) Exclusive, 4) Shared, 5) Modified.

Referring to FIGS. 4A, 4B, 5A, 5B, 6A, 6B, 7A, 7B, 8A, 8B, 9A, 9B, percentage of miss ratio improvement or degradation is shown with respect to the conventional random and random and invalid replacement policies. Note that a positive value indicates improved performance and a negative value shows worse performance than the conventional random policy. FIGS. 4–9 illustrate performance percent values of the cache block replacement method of the preferred embodiment relative to six different benchmark applications released to facilitate the study of multiple processor systems. A SPLASH-2 suite of parallel applications was released in 1995 to facilitate the study of centralized and distributed shared-address-space multiprocessors. The SPLASH-2 suite consisting of a mixture of complete applications and computational kernels including FFT, LU and RADIX are illustrated in FIGS. 4, 5 and 6. NAS-Parallel Benchmarks (NPB) developed in 1991 at NASA Ames Research Center to study the performance of parallel supercomputers including BUK, CGM, and MGRID are illustrated in FIGS. 7, 8 and 9.

Referring to FIGS. 4A, 4B performance percent values of the cache block replacement method of the preferred embodiment are shown relative to conventional random and random and invalid cache block replacement methods for the FFT application. The FFT kernel is a complex 1-D version of the radix $\sqrt{n}$ six step FFT algorithm which is optimized to minimize interprocessor communication. The data set consists of the n complex data points to be transformed, and another n complex data points referred to as the roots of unity. Both sets of data are organized as $\sqrt{n} \times \sqrt{n}$ matrices partitioned so that every processor is assigned a contiguous set of rows which are allocated in its local memory.

Referring to FIGS. 5A, 5B performance percent values of the cache block replacement method of the preferred embodiment are shown relative to conventional random and random and invalid cache block replacement methods for the LU application. The LU kernel factors a dense matrix into the product of a lower triangular and an upper triangular matrix. The dense n×n matrix A is divided into an N×N array of B×B blocks (n=NB) to exploit temporal locality on submatrix elements. To reduce communication, block ownership is assigned using a 2-D scatter decomposition with blocks being updated by the processors that own them. The block size B should be large enough to keep the cache miss rate low, and small enough to maintain good load balance.

Referring to FIGS. 6A, 6B performance percent values of the cache block replacement method of the preferred embodiment are shown relative to conventional random and random and invalid cache block replacement methods for the RADIX application. The integer radix sort kernel is iterative, performing one iteration for each radix r digit of the keys. In each iteration, a processor passes over its assigned keys and generates a local histogram. The local histograms are then accumulated into a global histogram. Finally, each processor uses the global histogram to permute its keys into a new array for the next iteration. This permutation step requires all-to-all communication. The permutation is inherently a sender-determined one, so keys are communicated through writes rather than reads.

Referring to FIGS. 7A, 7B performance percent values of the cache block replacement method of the preferred embodiment are shown relative to conventional random and random and invalid cache block replacement methods for the BUK application. The Integer Sort (BUK) Benchmark tests a sorting operation that is important in particle method codes. This type of application is similar to particle-in-cell applications of physics, wherein particles are assigned to cells and may drift out. The sorting operation is used to reassign particles to the appropriate cells. This benchmark test both integer computation speed and communication performance. This problem is unique in that floating point arithmetic is not involved.

Referring to FIGS. 8A, 8B performance percent values of the cache block replacement method of the preferred embodiment are shown relative to conventional random and random and invalid cache block replacement methods for the CGM application. In the Conjugate Gradient (CGM) Benchmark, a conjugate gradient method (CGM) is used to compute an approximation to the smallest eigenvalue of a large, sparse, symmetric positive definite matrix. This kernel is typical of unstructured grid computations in that it tests irregular long-distance communication and employs sparse matrix vector multiplication.

Referring to FIGS. 9A, 9B performance percent values of the cache block replacement method of the preferred embodiment are shown relative to conventional random and random and invalid cache block replacement methods for the MGRID application. The multigrid (MGRID) kernel benchmark is a simplified multigrid kernel, which solves a 3-D Poisson PDE. This problem is simplified in the sense that it has constant rather than variable coefficients as in a more realistic application. This code is a good test of both short and long distance highly structured communication. The Class B problem uses the same size grid as of Class A but a greater number of inner loop iterations.

From FIGS. 4A, 4B, 5A, 5B, 6A, 6B, 7A, 7B, 8A, 8B, 9A, 9B the following is concluded. With applications, such as BUK, RADIX, and FFT, different priority assignments have no significant effect on the performance of the pseudo random policies of the invention including SEM, SME, MSE, EMS, and ESM. Among the different variations of the pseudo random policies of the invention, the ESM policy performs reasonably well with all of the six test programs. That is, except for the LU with a 16K cache and the associativity size of 32, the FFT with a 64K cache and associativity sizes of 16 and 32, and MGRID with 16K cache and associativity sizes of 16 and 32, the ESM performs up to 34 percent better than the conventional random and the random and invalid policies. Increasing the cache size from 16K to 64K improves the performance impact of the ESM policy with respect to the set associativity size. For instance, with FFT and LU, the ESM performs similar to the conventional random and random and invalid policies with an 8 way set associative cache and a 16K cache. With a 64K cache and an 8 way set associative cache, on the other hand, the ESM miss ratio is improved by about 2 percent for FFT and for LU it shows about 28 percent improvement.

FIGS. 10A, 10B, 11A, 11B, 12A, 12B, 13A, 13B, 14A, 14B, 15A, 15B illustrate simulated performance effects of the cache block replacement method of the preferred embodiment relative to conventional random and invalid and least recently used (LRU) cache block replacement methods. In FIGS. 10A, 10B, 11A, 11B, 12A, 12B, 13A, 13B, 14A, 14B, 15A, 15B, miss ratio values are shown relative to the vertical axis and associativity sizes shown relative to the horizontal axis.

FIGS. 10 through 15 illustrate the ESM policy as representative of the pseudo random replacement policy the invention and support in general the following conclusions. For RADIX, CGM, BUK, and LU (except for the associativity size of 32 with a 16K cache), the ESM policy outperforms the random and invalid policy by up to 34 percent. Compared to the LRU policy, the ESM miss ratio is within −15 and +48 percent of the LRU miss ratio. For FFT and MGRID the ESM miss ratio is approximately within +5 and −6 percent of the miss ratio generated by the Random & Invalid policy. Note that the 6 percent increase in the ESM miss ratio occurs with a set associativity size greater than 16. Based on this study, it may be understood that with the appropriate priority assignment and a set associativity size of 16 or less, the pseudo random policy of the invention can potentially outperform the random and random invalid policies and in some cases outperform the LRU policy as well.

While the present invention has been described with reference to the details of the embodiments of the invention shown in the drawing, these details are not intended to limit the scope of the invention as claimed in the appended claims.

What is claimed is:

1. A cache block replacement method used with a cache including a plurality of cache blocks in a computer system responsive to a cache miss comprising the steps of:
    checking for an invalid block;
    responsive to identifying an invalid cache block, selecting said identified invalid block for replacement;
    checking for a first priority cache block and not equal to most recently used (MRU) state;
    responsive to identifying a first priority cache block and not equal to most recently used (MRU) state, selecting said identified first priority cache block not equal to most recently used (MRU) state for replacement;
    checking for a next priority cache block and not equal to most recently used (MRU) state;
    responsive to identifying a next priority cache block and not equal to most recently used (MRU) state, selecting said identified next priority cache block not equal to most recently used (MRU) state for replacement; and
    in the absence of identifying an invalid cache block, a first priority cache block and not equal to most recently used (MRU) state, or a next priority cache block and not equal to most recently used (MRU) state, randomly selecting one of the plurality of cache blocks for replacement.

2. A cache block replacement method as recited in claim 1 further includes the step of storing said most recently used state information in a cache block address tag field in a cache directory.

3. A cache block replacement method as recited in claim 1 wherein the step of checking for said invalid block includes the step of checking a cache block state field in a cache directory.

4. A cache block replacement method as recited in claim 1 wherein the step of checking for said first priority cache block and not equal to most recently used (MRU) state includes the step of checking both a block state field and an address tag field of most recently used state information in a cache directory.

5. A cache block replacement method as recited in claim 1 wherein the step of checking for said first priority cache block and not equal to most recently used (MRU) state includes the step of checking for a shared-modified cache block state and not equal to most recently used (MRU) state.

6. A cache block replacement method as recited in claim 1 wherein the step of checking for said next priority cache block and not equal to most recently used (MRU) state includes the step of checking for a shared cache block state and not equal to most recently used (MRU) state.

7. A cache block replacement method as recited in claim 1 wherein the step of checking for said next priority cache block and not equal to most recently used (MRU) state includes the step of checking for an exclusive cache block state and not equal to most recently used (MRU) state.

8. A cache block replacement method as recited in claim 1 wherein the step of checking for said next priority cache block and not equal to most recently used (MRU) state includes the step of checking for a modified cache block state and not equal to most recently used (MRU) state.

9. A cache block replacement method as recited in claim 1 wherein the step of checking for said first priority cache block and not equal to most recently used (MRU) state includes the step of checking for a shared-modified cache block state and not equal to most recently used (MRU) state and a shared cache block state and not equal to most recently used (MRU) state.

10. Apparatus for cache block replacement responsive to a cache miss in a cache including a plurality of cache blocks in a computer system comprising:
    a cache directory for storing cache block address tags and a most recently used (MRU) state field, each of said cache block address tags including a cache block state field,
    means for checking said cache directory for an invalid block;
    means responsive to identifying an invalid cache block, for selecting said identified invalid block for replacement;
    means for checking said cache directory for a first priority cache block and not equal to most recently used (MRU) state;
    means responsive to identifying a first priority cache block and not equal to most recently used (MRU) state, for selecting said identified first priority cache block not equal to most recently used (MRU) state for replacement;
    means for checking said cache directory for a next priority cache block and not equal to most recently used (MRU) state;
    means responsive to identifying a next priority cache block and not equal to most recently used (MRU) state, for selecting said identified next priority cache block not equal to most recently used (MRU) state for replacement; and
    means responsive to the absence of identifying an invalid cache block, a first priority cache block and not equal to most recently used (MRU) state, or a next priority cache block and not equal to most recently used (MRU) state, for randomly selecting one of the plurality of cache blocks for replacement.

11. Apparatus for cache block replacement responsive to a cache miss as recited in claim 10 wherein the cache is a set-associative cache and one said most recently used (MRU) state field is stored with each set, whereby said most recently used (MRU) state field is independent of the number of cache blocks within each set.

12. Apparatus for cache block replacement responsive to a cache miss as recited in claim 10 wherein the computer system is a multiple processor shared memory system and wherein one of five states is stored in said cache block state field for each cache block, said five states including invalid, shared-modified, shared, exclusive and modified.

13. Apparatus for cache block replacement responsive to a cache miss as recited in claim 12 wherein said means for checking said cache directory for said first priority cache block and not equal to most recently used (MRU) state include means for checking said cache block state field for a shared-modified state.

14. Apparatus for cache block replacement responsive to a cache miss as recited in claim 12 wherein said means for checking said cache directory for said next priority cache block and not equal to most recently used (MRU) state include means for checking said cache block state field for at least one of a shared state, an exclusive state or a modified state and not equal to most recently used (MRU) state.

15. A computer system comprising:

a processor;

a cache coupled to said processor, said cache including a plurality of cache blocks;

a plurality of input/output devices;

a bus connecting said processor and said plurality of input/output devices;

a cache directory for storing cache block address tags and a most recently used (MRU) state field, said cache block address tags including a cache block state field;

means, responsive to a cache miss, for checking said cache directory for an invalid block;

means responsive to identifying an invalid cache block, for selecting said identified invalid block for replacement;

means for checking said cache directory for a first priority cache block and not equal to most recently used (MRU) state;

means responsive to identifying a first priority cache block and not equal to most recently used (MRU) state, for selecting said identified first priority cache block not equal to most recently used (MRU) state for replacement;

means for checking said cache directory for a next priority cache block and not equal to most recently used (MRU) state;

means responsive to identifying a next priority cache block and not equal to most recently used (MRU) state, for selecting said identified next priority cache block not equal to most recently used (MRU) state for replacement; and means responsive to the absence of identifying an invalid cache block, a first priority cache block and not equal to most recently used (MRU) state, or a next priority cache block and not equal to most recently used (MRU) state, for randomly selecting one of the plurality of cache blocks for replacement.

16. A computer system as recited in claim 15 wherein the computer system is a cache coherent multiple processor system and wherein one of five states is stored in said cache block state field for each cache block, said five states including invalid, shared-modified, shared, exclusive and modified.

17. A computer system as recited in claim 16 wherein both said first priority cache block and said next priority cache block are at least one of said five states.

18. A computer system as recited in claim 16 wherein said means for checking said cache directory for said first priority cache block and not equal to most recently used (MRU) state include means for checking said cache block state field for a shared-modified state.

19. Apparatus for cache block replacement in a computer system comprising:

a cache including a plurality of cache blocks;

a cache controller for implementing a cache block replacement method responsive to a cache miss; said cache controller including;

a cache directory storing cache block address tags and a most recently used (MRU) state field, each of said cache block address tags including a cache block state field, each said cache block state field storing one cache block state, one of five states being stored in said cache block state field for each cache block, said five states including invalid, shared-modified, shared, exclusive and modified said cache controller utilizing said most recently used (MRU) state field and said stored cache block state for selecting a cache block for replacement; and wherein priorities are assigned to said five states for selecting a cache block for replacement and wherein an invalid state is assigned a highest priority.

20. Apparatus for cache block replacement as recited in claim 19 wherein said cache is a set-associative cache and one said most recently used (MRU) state field is stored with each set, whereby said most recently used (MRU) state field is independent of the number of cache blocks within each set.

* * * * *